May 19, 1925.  L. M. McGEORGE  1,537,994
SPRING DEVICE
Filed April 16, 1924
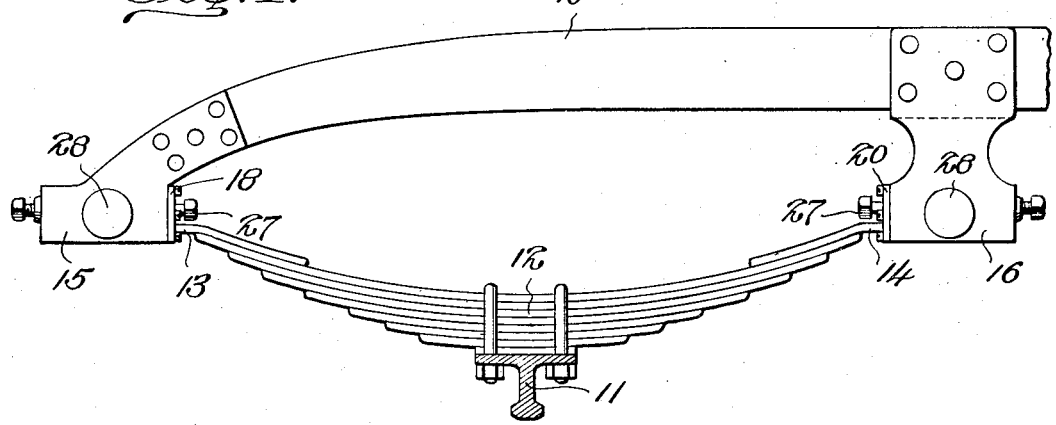
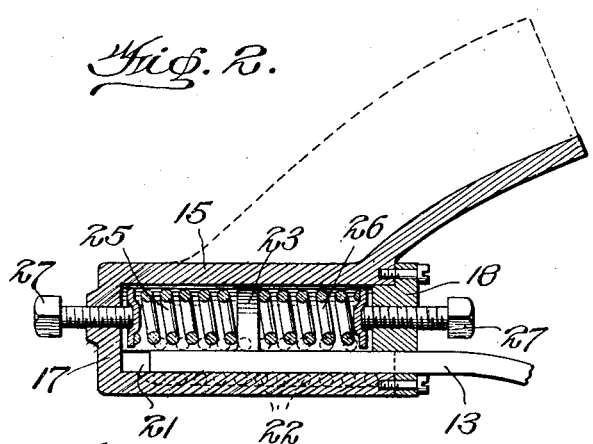
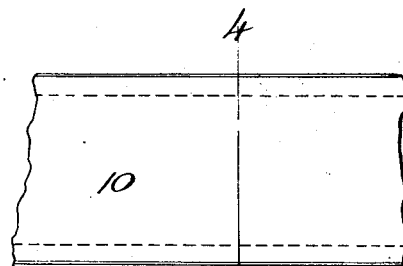
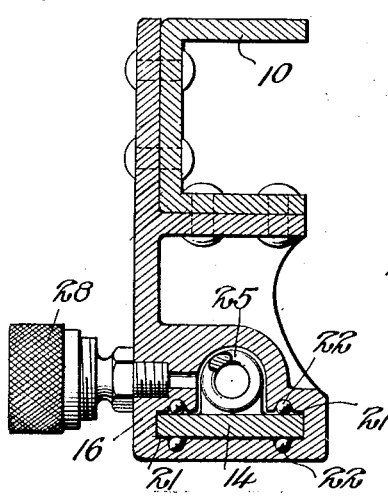
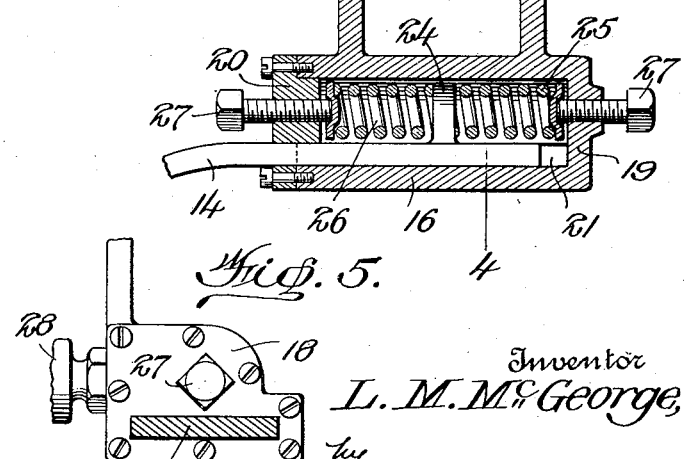
Inventor
L. M. McGeorge,
by Bright & Bailey
Attorneys Patented May 19, 1925.

1,537,994

UNITED STATES PATENT OFFICE.

LEONARD M. McGEORGE, OF RICHMOND, VIRGINIA.

SPRING DEVICE.

Application filed April 16, 1924. Serial No. 706,972.

*To all whom it may concern:*

Be it known that I, LEONARD M. McGEORGE, a citizen of the United States, and resident of Richmond, in the county of Henrico and State of Virginia, have invented certain new and useful Improvements in Spring Devices, of which the following is a specification.

My invention relates to spring devices and has particular reference to improvements in means for connecting the ends of leaf springs with vehicle frames, whereby pivoted shackle elements, as at present commonly employed in spring suspension device and which are subject to excessive wear and are as a consequence noisy in operation, are eliminated, and whereby compressive as well as rebound movements of leaf springs are checked.

My inventive idea is capable of embodiment in different mechanical structures, certain of which are illustrated in the accompanying drawings, but it is to be understood that the structures herein shown are intended merely as disclosures of my invention in certain preferred forms and that its scope is as defined in the appended claims.

In the drawings, wherein like characters of reference denote corresponding parts in the different views:

Figure 1 is a view in elevation showing a vehicle frame, a leaf spring and my improved connections between the ends of the spring and the frame;

Figure 2, a central longitudinal section through one of the connections;

Figure 3, a sectional view similar to Figure 2 through the other connection;

Figure 4, a transverse section on the line 4—4 of Figure 3; and

Figure 5, an elevation of the inner end of one of the connections.

Referring now to the drawings, in detail, 10 designates one of the side bars of a vehicle frame, 11 one of the axles of the vehicle, in this instance the front axle, and 12 a conventional leaf spring, in this instance of the semi-elliptic type, mounted on the axle and yieldably supporting the frame 10 therefrom.

In carrying out my invention in its preferred form illustrated in the drawings, I provide at the ends of spring 12 extensions 13 and 14, respectively, and to the frame 10 I secure a pair of housings 15 and 16 within which said end extensions of the spring are, respectively, adapted to operate.

The housing 15 preferably is permanently closed at its outer or forward end by a wall 17 and is normally closed at its inner or rear end by a plate 18 which plate is secured to the housing by studs or other suitable fasteners whereby it is removable to permit assembly and disassembly of the extension 13 with the housing. Likewise the rear end of housing 16 is permanently closed by a wall 19 and at its forward end is normally closed by a removable plate 20 thereby to permit assembly and disassembly of extension 14 with respect to said housing.

The extensions 13 and 14 pass snugly through openings in the plates 18 and 20, respectively, and within the housings 15 and 16 are slidably engaged at their edges in channels or grooves 21, their upper and lower faces contacting with suitable anti-friction means such as rollers or balls 22 carried by the respective housings, so that they are substantially unresisted in their sliding movement.

Fixed to the extensions 13 and 14 are lugs 23 and 24, respectively, that are disposed within elongated recesses within the respective housings, and bearing against opposite sides of each of said lugs is a pair of coil springs 25 and 26, respectively, the springs of each pair acting one against the other to hold their associated lug and consequently their associated end extension of the leaf spring centrally or substantially centrally of the housing. Thus it is apparent that as compression of the leaf spring takes place with the result that its end extensions move outward, the coil springs 25, 25 act to resist such outward movement and as a consequence buff the leaf spring during compression thereof, while on the other hand, when rebound of the leaf spring occurs and the end extensions tend to move abnormally inward, the coil springs 26, 26 act to resist such inward movement and as a consequence check the rebound.

Threaded in each of the plates 18 and 20 and also in the closed end walls 17 and 19 of the respective housings and bearing against the ends of the coil springs are screws 27 by means of which the force of said coil springs may be adjusted to render the connections between the leaf spring and the frame more or less resilient in their action thereby to meet the desires of individual users of the devices.

A grease cup or other device 28 is provided for supplying lubricant within each housing where it is retained due to the fact that each housing as constructed entirely encloses the operating parts of the respective devices.

While I have herein shown one of my improved connections at each end of the leaf spring, it is manifest that only a single such connection might be employed at one end of the leaf spring and the latter might be secured at its other end to the frame in any approved or desired manner. Furthermore, various changes and desirable additions may be made in and to the structure shown within the spirit and scope of my invention as defined in the appended claims.

I claim:—

1. The combination with the frame and axle of a vehicle and a leaf spring supporting the frame from said axle; of a housing secured to the frame, and provided with grooves, an end extension on said leaf spring extending into said housing and slidably engaged at its edges within said grooves, and means within said housing cooperating with said end extension to check rebound movements of said leaf spring.

2. The combination with the frame and axle of a vehicle and a leaf spring supporting the frame from said axle; of a housing secured to the frame, said housing being closed at one end and open at the other, a plate normally closing the open end of said housing, an extension on said leaf spring passing through an opening in said plate into said housing, and means within said housing coacting with said leaf spring extension to buff compressive movements and to check rebound movements of said leaf spring.

3. The combination with the frame and axle of a vehicle, and a leaf spring supporting the frame from said axle; of a housing secured to the frame, an end extension on said leaf spring extending into and movable within said housing, spring means within said housing cooperating with said end extension when the latter is moved due to compressive and rebound movements of said leaf spring to buff and check such movements of said leaf spring, respectively, and anti-friction means within said housing forming a bearing for said end extension.

4. The combination with the frame and axle of a vehicle, and a leaf spring supporting the frame from said axle, said leaf spring having an end extension; of a housing secured to the frame, said housing having end walls through an opening in one of which the end extension of said leaf spring extends into the housing, a lug on said end extension between the end walls of said housing, two coil springs, one between each end of the housing and the adjacent side of said lug, and a screw member threaded in each end wall of the housing for independently adjusting the force of the respective springs.

In testimony whereof I hereunto affix my signature.

LEONARD M. McGEORGE